Feb. 7, 1961 R. F. SKELTON 2,970,532
APPARATUS FOR AUTOMATIC PROPORTIONED MIXING AND GRINDING
Filed Feb. 8, 1954 5 Sheets-Sheet 1

INVENTOR.
ROBERT F. SKELTON
BY
Wheeler, Wheeler + Wheeler
ATTORNEYS

Feb. 7, 1961  R. F. SKELTON  2,970,532
APPARATUS FOR AUTOMATIC PROPORTIONED MIXING AND GRINDING
Filed Feb. 8, 1954  5 Sheets-Sheet 2
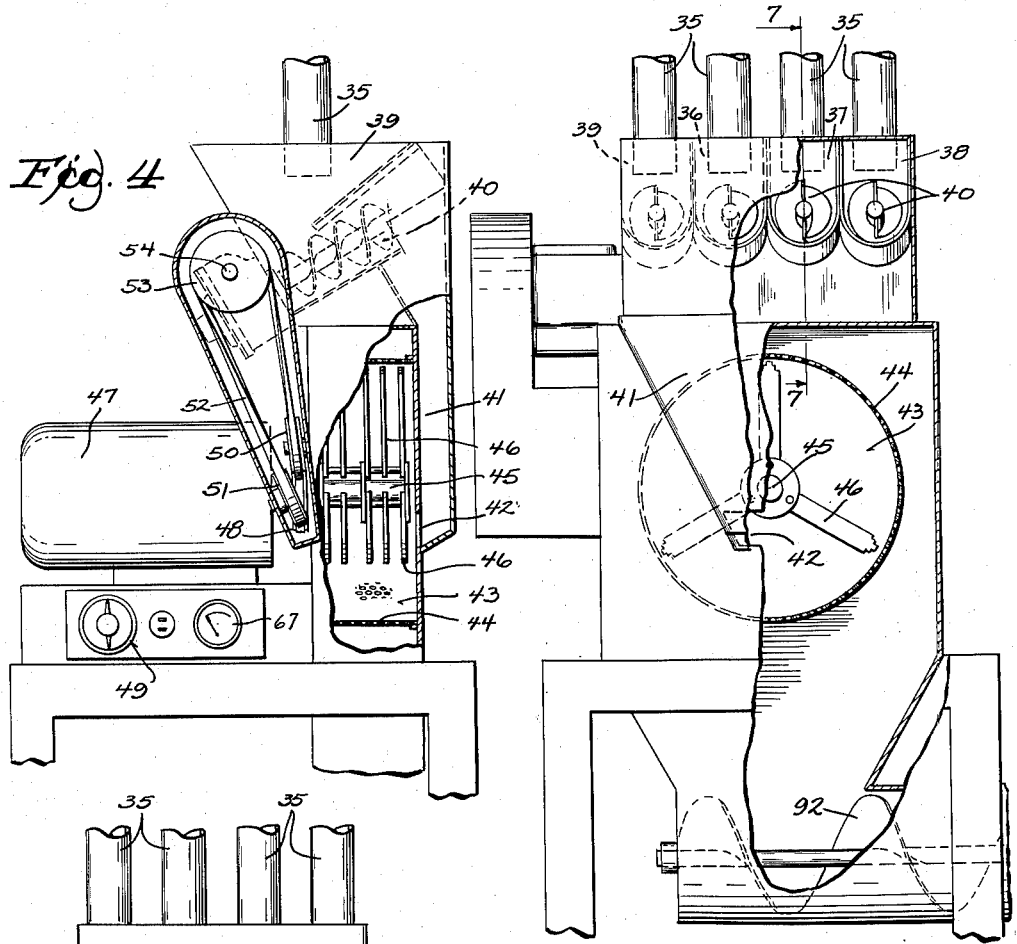
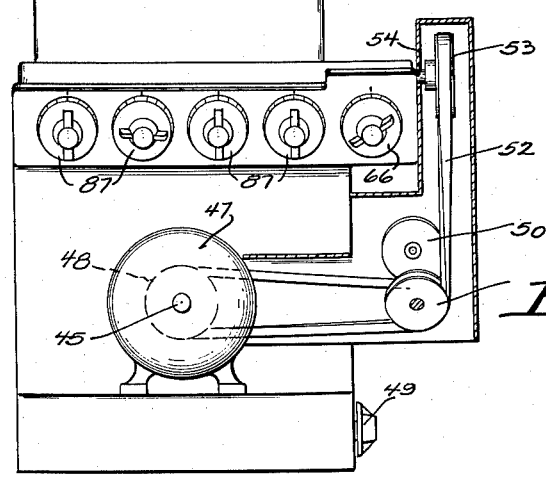
INVENTOR.
ROBERT F. SKELTON
BY
Wheeler, Wheeler & Wheeler
ATTORNEYS

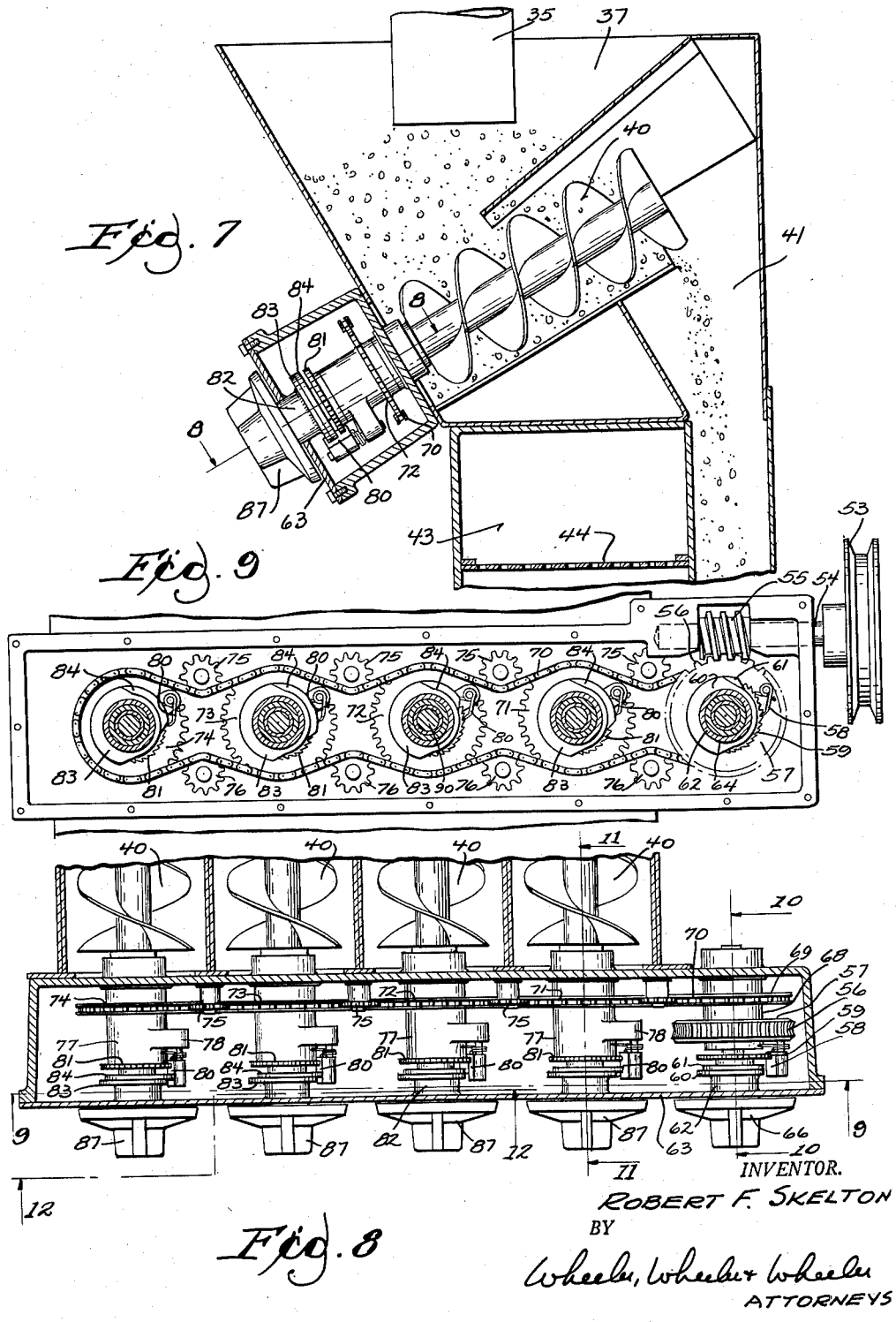

INVENTOR.
ROBERT F. SKELTON
BY
Wheeler, Wheeler & Wheeler
ATTORNEYS

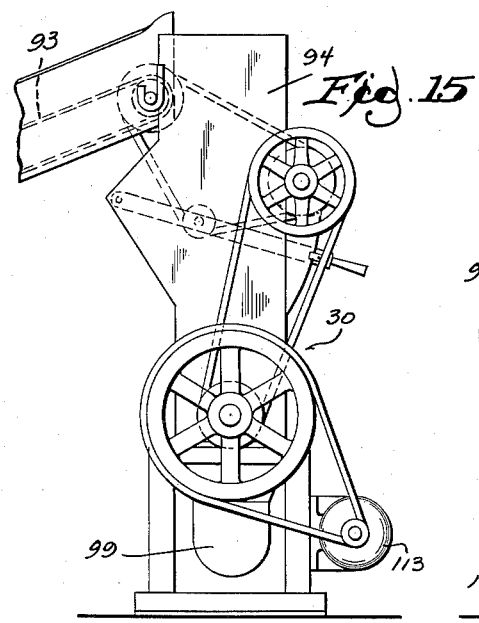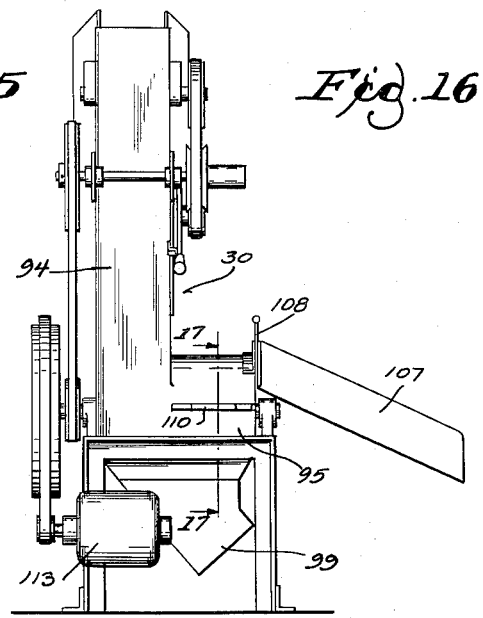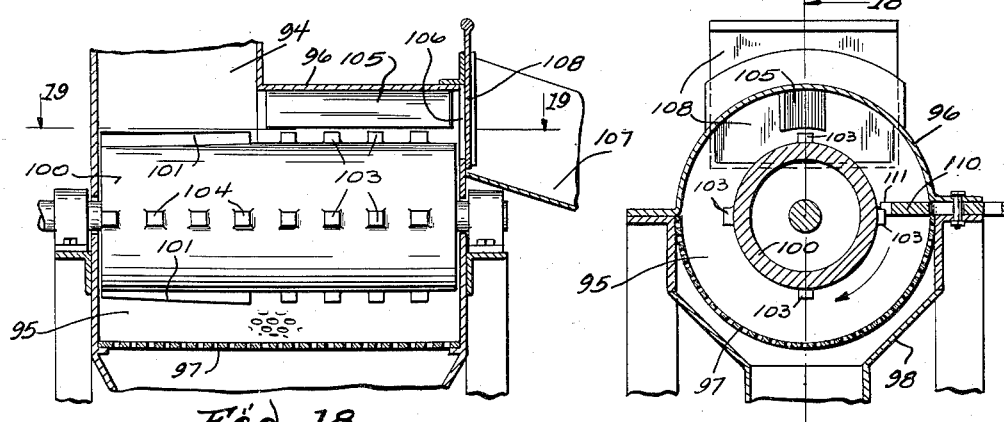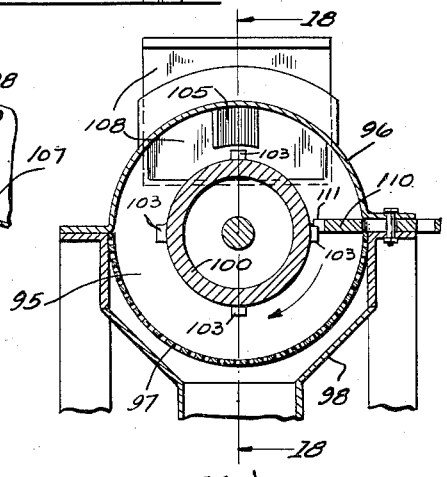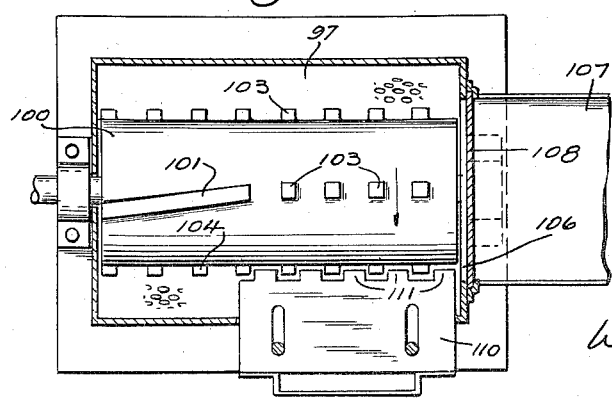

United States Patent Office

2,970,532
Patented Feb. 7, 1961

2,970,532

APPARATUS FOR AUTOMATIC PROPORTIONED MIXING AND GRINDING

Robert F. Skelton, Racine, Wis., assignor to Belle City Manufacturing Company, Racine, Wis., a corporation of Wisconsin Filed Feb. 8, 1954, Ser. No. 408,744

13 Claims. (Cl. 99—235)

This invention relates to feed preparation and automatic proportioned mixing and grinding.

It is an object of the invention to provide a device of this character on a scale for use by an individual farmer. A very high percentage of all manual labor still performed on a dairy farm and on a lesser degree, on other stock farms, is related to the handling of feed. Dairy farms will be used as an example. Dairy herds require, according to conditions, any one of twelve basic formulae, most of which use at least three or four primary ingredients in varying proportions. If the farmer buys his feed in sacks, he not only pays a premium to the producer but may have to store feed in varying formulae. Even if the farmer raises his own grain, he must either transport it to a mill where it can be ground and mixed or must spend his own time in the constant supervision of these operations.

Available feed grinding mills are large and use high power. Inasmuch as they require constant supervision, the farmer must remain in attendance, and this requires a large motor in order that the grinding may be completed within any reasonable period of time. Thereafter he still has the problem of mixing the materials in the proper proportions. Usually large batches are handled at one time and this involves a storage problem and a spoilage problem. When the grain is commercially ground, it is ordinarily handled in large quantities so that storage and spoilage problems are also encountered under those circumstances.

The present invention contemplates that all of the ingredients required for the feed mix will be stored in their natural state to avoid spoilage. These ingredients are stored in or delivered to hoppers individual to the respective ingredients. From these hoppers the various materials are withdrawn through variably adjustable proportioning feeding devices which deliver the ingredients concurrently into a hammer mill in which they are not only ground but simultaneously mixed. The proportioning devices include an over-all control calibrated in terms of the requirement of one cow and adjustable to a position corresponding to the total number of cows to be fed. When the apparatus is set in operation it will continue to function until it has ground and mixed a supply of feed accurately equaling the total number of the herd for one day.

Driven from this master control are subordinate controls which regulate delivery from the several hoppers, whereby the various ingredients are metered into the hammer mill in the precise proportions required by the selected formula. These two types of control make it unnecessary for an attendant to remain in charge of the operation of the device. Hence, instead of using a large and expensive motor of high power, driving correspondingly large and expensive equipment, it becomes possible to use a small motor which will operate small, compact and relatively inexpensive equipment over whatever period is required to produce the requisite amount of feed, no more and no less. These changes make it feasible to supply feed grinders and mixers for use by individual farmers.

The specific proportioning mechanism desirably comprises driving and driven rotors which are concentric. In each case the driving rotor comprises one or more pawls and the driven rotor comprises a ratchet wheel having a multiplicity of teeth. The pawls are of sufficient width to extend over a cam which is of peripherally variable extent and which, according to the adjustment of its movable component, will lift the pawl from engagement with a tooth of the ratchet wheel after a predetermined peripheral travel. A calibrated dial is connected with the movable component of the cam. As above indicated the calibrations are desirably in terms of one cow's daily requirement, in the case of the primary control, and in terms of a percentage of the mix, in each of the secondary controls.

The driven elements of the secondary controls are mounted on screw conveyor shafts which are set at an upward inclination from their receiving ends to their discharge ends. The upward inclination precludes any gravity delivery and assures that the material handled by each screw conveyor will accurately reflect the extent to which such conveyor is rotated in response to the setting of its controlling dial. The several screw conveyors discharge into a chute common to all of them and leading to the inlet to the hammer mill.

As a safety feature, to prevent the device from operating in the event that one of the supply chambers is empty, I preferably employ, in series with the actuating motor, a set of switches, individual to the respective bins, and controlled by the pressure of diaphragms exposed to the contents of the bins, the switches being self-opening when pressure on their respective diaphragms is relieved due to exhaustion of the bin contents.

The operation of the whole device is further controlled by a timing switch which determines the period for which the motor will continue to function, assuming the bins to remain full. Obviously, it is possible, according to the power of the motor, to actuate the device for a longer period or a shorter period, according to the setting of the primary control, which determines the total amount of feed produced in that period. Within the stated period of operation, as determined by the timing switch, the amount of feed per cow is increased or decreased by adjusting the primary control, the effect being substantially the same as the increase or decrease of the time of operation, but permitting of more flexibility.

In many cases it is desirable to supply, as one of the components of the feed, ground corn cobs as well as ground corn. Accordingly, one of the parts of the whole apparatus may comprise a special grinder having relatively adjustable elements which may be set in such a manner that the device will either remove corn from the cob, discharging the cob and delivering solely the corn kernels or, alternatively, to grind the cob into particles sufficiently small to permit delivery of the ground cob along with the shelled corn. The use of this convertible equipment is, of course, optional.

In the drawings:

Fig. 4 is a view in side elevation of the proportioning and grinding apparatus shown in Fig. 1, with portions of the hammer mill casing and its feed chute being broken away.

Fig. 5 is a view in front elevation of the structure shown in Fig. 4.

Fig. 6 is a view in rear elevation of the structure shown in Fig. 4, portions of the wall being broken away.

Fig. 7 is a view on an enlarged scale taken in section on the lines 7—7 of Fig. 6.

Fig. 8 is a view taken in section on a further enlarged scale on the line 8—8 of Fig. 7.

Fig. 9 is a view taken in section on the line 9—9 of Fig. 8.

Fig. 15 is a view in front elevation of the corn shelling and cob grinding portion of the device shown in Fig. 1.

Fig. 16 is a view in side elevation of the device of Fig. 15.

Fig. 17 is a view taken in section on the line 17—17 of Fig. 16.

Fig. 18 is a view taken in section on the line 18—18 of Fig. 17.

Fig. 19 is a view taken in section on the lines 19—19 of Fig. 17.

Figure 2:
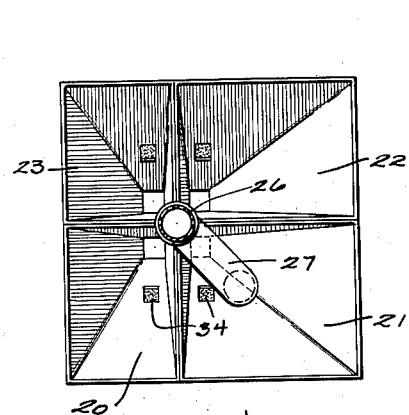
Fig. 2 is a plan view of a portion of the apparatus shown in Fig. 1 taken in section on the line 2—2 of Fig. 1.

For purposes of illustration, I have shown a set of four bins 20, 21, 22, 23 for the various ingredients to be mixed and ground. The specific number of bins is not relevant to the invention. A pneumatic conveyor system is used to fill these bins. The material to be placed in the bins may be deposited in the dump pit 24 which feeds the inlet to blower 25, from the casing of which conveyor pipe 26 leads to a position above the several bins. The pipe has a rotatable elbowed discharge portion 27 which, by rotation, may be registered with any one of the bins for delivery thereto of material from the dump pit 24. The grain or other material to be raised into the overhead bins may be discharged from a truck into the dump pit 24 or, if such material comprises corn or ground cobs, it may be delivered into the pit 24 from the combination sheller and cob grinder shown at 30 and hereinafter to be described.

Figure 3:
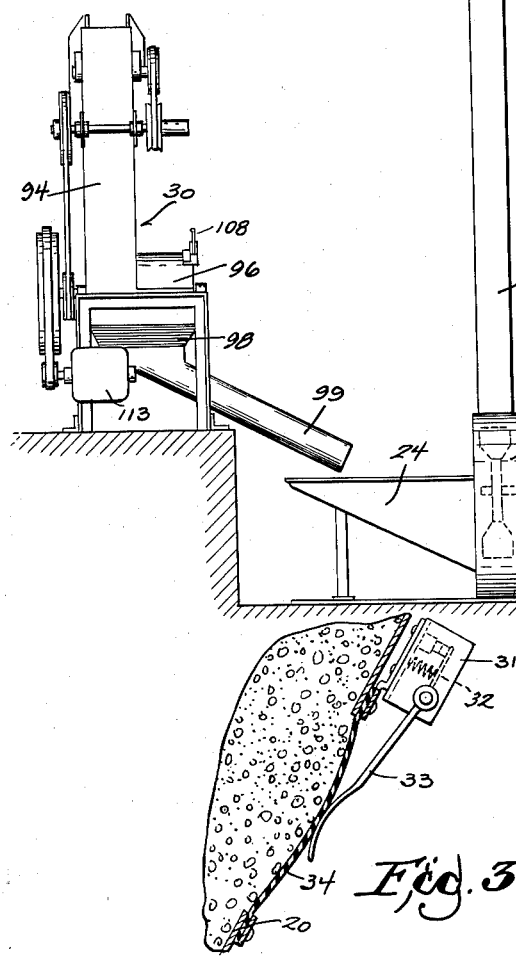
Fig. 3 is an enlarged fragmentary detail view taken in section on the line 3—3 of Fig. 1.

Mounted on the side walls of the several bins, near the bottoms of the respective bins, are the switches 31, so connected to control the motor which drives the apparatus as to require that the bin contain a supply of material, as a condition to the functioning of the mixing and grinding apparatus. As shown, by way of example, the switches 31 are normally open, under the bias of their respective springs 32 (Fig. 3). Each switch is provided with a contact actuator 33, the free end of which bears against a diaphragm 34 which is exposed to the pressure of the contents of the bin to be bulged outwardly against the contact actuator and to close the switch contacts as shown. If the contents of the bin fall below the level of the diaphragm 34 the switch will open to stop the movement of the apparatus, thereby precluding it from continuing to function under circumstances such that the proportions of the various ingredients would be incorrect.

The discharge spouts 35 from the several bins lead into individual hoppers 36, 37, 38 and 39 respectively. In the bottoms of the respective hoppers are screw conveyors 40 which are upwardly inclined as best shown in Fig. 7 from their intake ends to their discharge ends. The discharge ends of the respective conveyors communicate with a chute 41 at the rear of the device, the sides of which converge downwardly toward the inlet port 42 that opens into the hammer mill 43. This mill conventionally comprises a screen at 44 concentric around its drive shaft 45 on which hammers 46 are pivotally mounted, their free ends traversing a path in close proximity to the annular screen. Shaft 45 may be a direct extension of the armature shaft of the motor 47 which drives the proportioning and grinding apparatus. On the shaft is a drive pulley 48 from which the proportioning feeding mechanisms operate the several screw conveyors 40 in a manner hereinafter to be described. The motor is controlled by a conventional timer indicated at 49, the details of which are unimportant to the present invention. It determines the over-all period for which the device will operate when set in motion by manipulation of the timer, assuming that the bins remain full throughout such period.

Passing about the drive pulley 48 and the idler pulleys 50, 51 is a belt 52 which encircles driven pulley 53 mounted on the shaft 54 of worm 55 as shown in Fig. 9. Worm 55 meshes with worm teeth 56 on the driving rotor 57 of the master control. This rotor carries one or more pawls 58 sufficiently wide so that they not only engage the teeth of the driven ratchet wheel 59 but are engaged by the relatively fixed and movable elements 60 and 61 of the control cam. The pawls are biased to the cams by torsion springs 580. (See Figs. 10, 11, 14.)

Figures 10, 11:
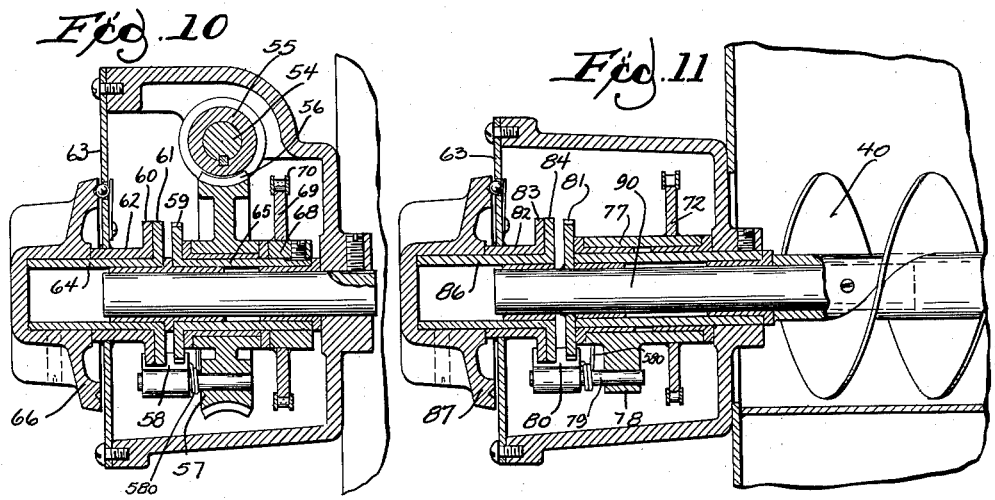
Fig. 10 is a further enlarged view taken in section on the line 10—10 of Fig. 8.
Fig. 11 is an enlarged detail view taken in section on the line 11—11 of Fig. 8.
Figure 12:
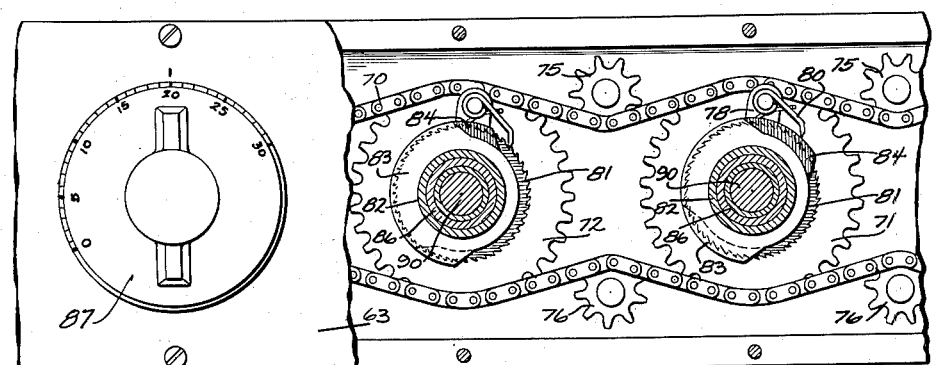
Fig. 12 is a view taken on line 12—12 of Fig. 8.

The fixed cam element 60 is mounted on a sleeve 62 connected to the front wall of the housing 63 as shown in Fig. 10. The movable element 61 is carried by the tubular shaft 64 which is concentric with the driven shaft 65. The tubular shaft projects from the front of the housing and is provided with a dial 66 which has calibrations which may indicate the total number of cattle to be fed. If the dial 66 is adjusted to calibration number 1, indicating that only one cow is to be fed, the relatively movable cam element 61 will be rotated clockwise as viewed in Fig. 9 to extend the over-all peripheral extent of the control cam to hold the pawl 58 out of engagement with the ratchet wheel 59 for most of the travel of the driving element 57. In consequence, there will be but little movement of the driven shaft 65 during an entire rotation of the driving rotor 57, with the result that in the period of operation for which the timer is set (which may be on the general order of one-half hour), there will be only sufficient feed handled by the device to serve a single cow.

If the control dial 66 is set at the calibration indicating that ten cows are to be fed, the over-all length of the composite cam 60, 61 will be so far reduced as to permit the pawl 58 to remain engaged with ratchet 59 for ten times as great a period in each rotation of driving rotor 57. In consequence, the same over-all period of operation will result in producing feed for ten cows.

Figure 13:
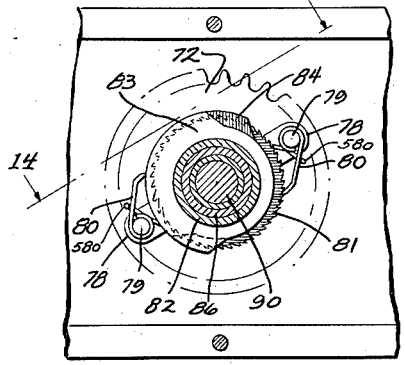
Fig. 13 is a fragmentary detail view similar to a portion of Fig. 12 and showing a modified embodiment of the invention.
Figure 14:
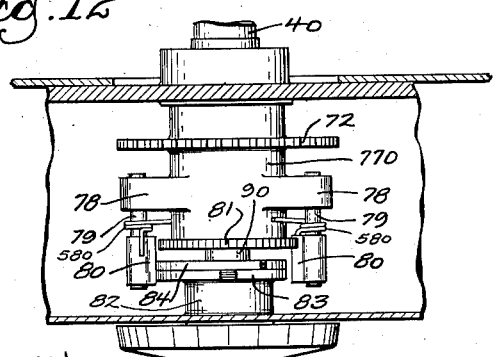
Fig. 14 is a view taken in section on the line 14—14 of Fig. 13.

As suggested in Figs. 13 and 14 a number of pawls can be controlled by a single cam of peripherally adjustable extent to multiply, correspondingly, the number of advances of the driven shaft occurring in each rotation of the driving rotor. Figs. 13 and 14 show two pawls 80 controlled by a single adjustable cam to produce twice the output of feed which will result in the use of a single pawl controlled by the same cam.

The means whereby the primary control delivers the feed to the hammer mill through the secondary controls will now be described.

The driven shaft 65 of the primary control carries the hub 68 of a sprocket 69 over which the chain 70 is trained. This chain passes successively about portions of driven sprockets 71, 72, 73 and 74. Between successive sprockets there are pairs of upper and lower idlers 75 and 76 which increase the wrap of the chain about the successive sprockets. All of the sprockets are thereby driven in unison to be advanced, in each rotation of the driving rotor 57 of the primary control for a distance determined by the setting of the primary controls.

Each of the sprockets 71, 72, 73 and 74 becomes the driving element of a secondary control. Each has a hub 77 (Fig. 11) from which projects an arm 78 with a projecting finger 79 on which the pawl 80 is pivoted. There may be more than one arm and more than one pawl as suggested in Figs. 13 and 14 where two such arms and two such pawls are shown on a single hub 770. Regardless of the number of pawls per hub, the respective pawls engage the teeth of respective ratchets 81 for such portion of their path of revolution as is permitted by the pawl displacing cam elements 83, 84. As in the primary control previously described, the cam elements 83 are fixedly supported on sleeves 82 from the front wall 63 of the casing. Through the sleeve 82 extends the tubular shaft 86 on which the adjustable cam sector 84 is mounted, and which also carries the dial 87 of each secondary control unit.

Figure 1:
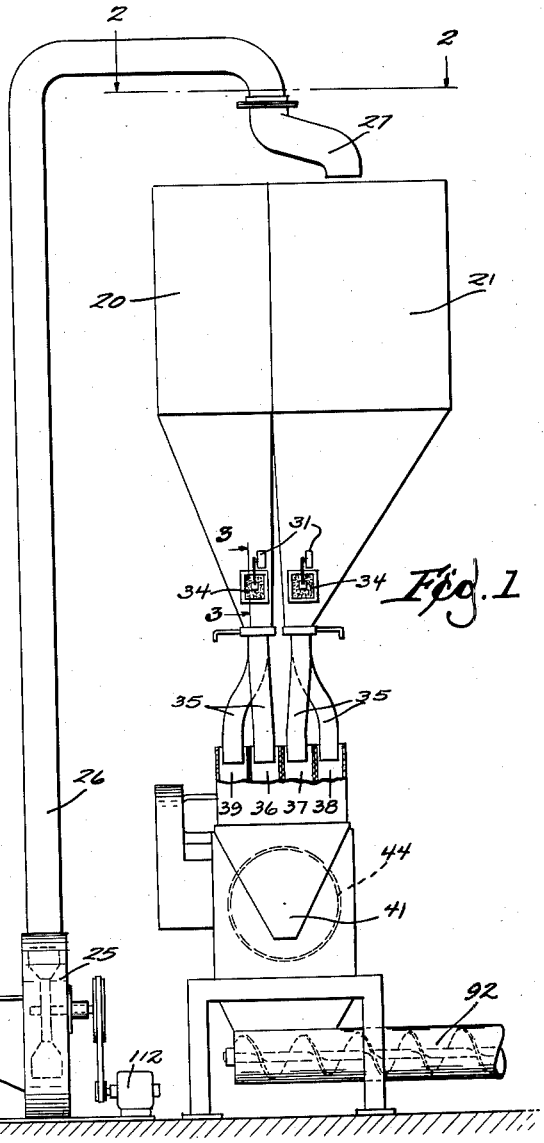
Fig. 1 is a view in side elevation of apparatus embodying the invention, portions being broken away to vertical section.

Rotation of the dial extends the periphery of the composite cam to lift the pawl or pawls 80 from the ratchet for a greater or lesser portion of the circumferential travel of the pawl, thereby enabling the driven shaft 90 of the respective unit to be rotated for any desired proportion, within the capacity of the adjustment of the device, of each single rotation of the driving hub 78. Each driven shaft 90 is connected directly with the appropriate feed screw 40, whereby each feed screw is, in each rotation of the unit driver, rotated for a desired distance. Since each of the several driving elements of the secondary controls is rotated for the same distance, in the course of each unit advance of the primary control, the adjustment of the several knobs 87 of the secondary controls will regulate the relative feeding operation of the several conveyors 40 and will thereby determine proportionate feed effected by such conveyors. All of the ingredients severally discharged by the respective screws 40 into the chute 41 which is common to them all, will be delivered concurrently into the hammer mill and simultaneously mixed and ground and discharged through the output conveyor 92 which leads from the bottom of the hammer mill as shown in Fig. 1. The fact that the several screw conveyors 40 operate on upwardly inclined axes requires the several controls and the housing therefor to be correspondingly tilted as shown in Fig. 7.

Assuming that some of the components of the feed comprise corn and/or ground cobs, I may use the combination grinding or sheller generically designated by reference character 30 and shown in Fig. 1 and more particularly in Figs. 15–19 inclusive.

The corn on the cob is delivered by means of conveyor 93 to a hopper 94 which opens vertically downwardly into the shelling chamber 95. This chamber comprises a semi-cylindrical top wall 96 (Fig. 17) and a semi-cylindrical foraminous screen 97 serving as its bottom wall. Below the screen is a collar 98 from which spout 99 leads to a point of delivery which, in the installation shown in Fig. 1, may be the pit 24 of pneumatic elevator 25, 26. The openings in the screen 97 are sufficiently large to pass the shelled corn.

Rotatable in chamber 95 is a cylinder 100 provided for a part of its length with feeding ribs 101 inclined with reference to the cylinder axis and located at diametrically opposite points. Beyond these ribs the cylinder is provided with a row of square-cut shelling projections 103. A row of similar projections 104 intervene between the feeding ribs or flanges 101. The cylinder causes the ears of corn to move about within the chamber 95 until the abrasion of the ears upon each other and upon the screen 97 displaces the kernels, which thereupon pass through the screen and are discharged. The cobs ultimately tend to be lifted by the projections 103 into engagement with the angularly set baffle 105 carried by the top wall 96 above the cylinder. This baffle deflects the cobs through a port 106 onto the discharge chute 107 unless a gate at 108 is lowered to the position shown in Figs. 17 and 18. If the gate is down, egress of the cobs is precluded. If a plate 110, laterally adjustable through the side of the chamber 95, is pushed inwardly as shown in Fig. 19, it functions like the concave of a feed cutter to cooperate with the teeth 103 of the cylinder 100 for the disintegration of the cobs. The disintegrating action continues until the pieces are sufficiently small to pass through the openings of the screen 97 along with the kernels of corn.

Accordingly, with the gate 108 up and the slide 110 retracted, the device operates to shell the corn and discharge the cobs. With the gate lowered and the slide advanced as shown, the teeth 111 of the slide intermesh with the teeth 103 of the cylinder 100 to disintegrate the cobs and to make a feed which is a composite of the cob particles and the shelled corn. In that event, both the corn and the fragments of the cobs pass together into the pit 24 to be elevated to the appropriate storage bin with which the rotatable spout 27 registers during operation of blower 25.

Since the pneumatic elevator, of which blower 25 is a part, will ordinarily function separately from the feed mixer and grinder, it is provided with its own motor 112 as shown in Fig. 1. Similarly the combination corn sheller and cob disintegrator device may have its own motor as indicated at 113 in Figs. 1, 15 and 16.

It will be understood that the foregoing disclosure is representative of various embodiments of the invention which can be produced within the scope of the appended claims and reference has been made to the grinding and mixing of feed for cattle principally because it is the feeding of cows which presents the greatest labor problem in animal husbandry.

It will be understood that the use of several of the features above described is optional and I do not wish to be limited except as indicated in the appended claims. Specifically, it is obviously unnecessary that the overall control as calibrated in terms of the requirement of one cow, this having been indicated as preferred practice. In actual operation, it may often be preferable to operate the motor substantially at capacity. To this end, the motor is provided with an ammeter at 67 (Fig. 4). If the dial 66 is turned to increase the capacity until the ammeter shows that the motor 47 is operating at maximum permissible load for the particular mix being ground, it is then possible to make an appropriate adjustment of the timer 49 for the total amount of feed to be produced in that operation.

It will also be apparent that the pressure operated switches 31 (Fig. 1 and Fig. 3), while very desirable, are not essential to the functioning of the system as a whole. Similarly, other preferred features can be modified or omitted within the scope of the appended claims.

I claim:

1. Apparatus for preparing a batch of stock food comprising in combination a grinding and mixing device having a feeding opening, a plurality of feeding conveyors discharging into said opening, hoppers from which the respective conveyors operate for the delivery of contents of the respective hoppers into the opening of said device, intermittent driving means to the several conveyors including means for predetermining the relative rate of operation thereof by selectively varying the time duration of intermittent drive to said conveyors, and motor means operatively connected with said driving means and with said device and having a time control whereby said device and driving means may be set for a predetermined period of operation.

2. Apparatus for preparing a batch of stock food comprising in combination a grinding and mixing device having a feeding opening, a plurality of feeding conveyors discharging into said opening, hoppers from which the respective conveyors operate for the delivery of contents of the respective hoppers into the opening of said device, intermittent driving means to the several conveyors including means for predetermining the relative rate of operation thereof by selectively varying the time duration of intermittent drive to said conveyors, and motor means operatively connected with said driving means and with said device and having a time control whereby said device and driving means may be set for a predetermined period of operation in further combination with a rate changer between the motor means and the several conveyors aforesaid for controlling the rate of operation of all of the conveyors during said period of operation of the motor means, whereby to regulate the total of material delivered from said hoppers independently of the relative amounts of material delivered from respective hoppers.

3. Apparatus for preparing stock food comprising in combination a grinding and mixing device having a feeding opening, a plurality of feeding conveyors discharging into said opening, hoppers from which the respective conveyors operate for the delivery of contents of the respective hoppers into the opening of said device, driving means to the several conveyors including means for predetermining the relative rate of operation thereof, and motor means operatively connected with said driving means and with said device and having a time control whereby said device and driving means may be set for a predetermined period of operation, said conveyors comprising a battery of feed screws all of which are set at an upward angle of inclination, said screws having a common receiving spout extending downwardly from the several screws to the opening of said device, said driving means comprising means to intermittently drive said screws and to selectively vary, as between the several feed screws, the time duration of feed screw rotation.

4. The device of claim 3 in which the means for predetermining the relative rate of operation of the several conveyor screws comprises concentric driving and driven rotors for the several screws, means connecting the respective driving rotors for simultaneous operation, a pawl mounted on each driving rotor, a ratchet connected with each driven rotor and having teeth normally engaged by the pawl and cam means of adjustable peripheral extent for controlling the arc through which the respective pawls engage their respective ratchet teeth.

5. The device of claim 4 in which the respective cam means comprise relatively fixed cam sectors and rotatably adjustable cam sectors, the respective pawls having means engageable with the fixed and rotatable cam sectors for the extent of their combined peripheries and a dial connected with each adjustable cam sector and positioned for manual adjustment.

6. The device of claim 4 in which each driving rotor is provided with a plurality of pawls angularly spaced from each other and engageable successively with the same ratchet, one pawl being adapted to engage the ratchet during a portion of the period another pawl is maintained by said cam means free of ratchet engagement.

7. A device of the character described comprising a plurality of hoppers containing various kinds of feed to be mixed, a set of generally parallel upwardly inclined screw conveyors opening from the respective hoppers for the discharge of hopper contents proportionate to the operation of the respective conveyors, a common discharge chute into which the several conveyors discharge material from the respective hoppers, a mixing device having a feed opening into which said chute delivers material from the respective hoppers an electric power source for driving said mixing device, and means including adjustable intermittent driving connections to respective feed screws to selectively vary, as between the several feed screws, the time duration of feed screw rotation for proportioning the amount of material delivered from the respective hoppers to the mixing device.

8. The device of claim 7 in further combination with pressure operated switches mounted on the respective hoppers and having pressure sensitive controls exposed to the contents thereof, said power source being dependent upon said switches for its continued operation whereby the mixing operation will cease in the event that the contents of any hopper become exhausted to the level of its pressure responsive switch.

9. The device of claim 7 in which a control set is disposed across the lower ends of the several feed screws comprising pairs of substantially co-axial driving and driven rotors individual to the respective screws, the driven rotors and respective screws being in driving connection, each driving rotor having a pawl and each driven rotor having peripherally spaced shoulders engageable by the pawl, means for controlling the peripheral extent of pawl engagement with respective shoulders in the course of each rotation of each driving rotor, said set including means for predetermining the functioning of said control means.

10. The device of claim 9 in which the last mentioned means comprises a panel, a dial on the panel for each such set of rotors, cam means of variable peripheral extent about the axis of the driven rotor, each cam means including a rotatively adjustable sector, and a motion transmitting connection from each dial to one of said rotatably adjustable sectors, whereby the dial fixes the position of the sector, the cam means having pawl engaging portions for engaging and disengaging each pawl from one of the shoulders aforesaid in the course of rotation of the rotors.

11. A device of the character described comprising a hammer mill having an inlet and a hammer shaft, a motor in driving connection with the hammer shaft, a proportioning housing mounted above the hammer mill and having a discharge chute leading to the hammer mill inlet, partition means within the proportioning housing defining a plurality of passages inclined upwardly and discharging into said chute, upwardly inclined feed screws in the respective passages, a plurality of hoppers having individual connections to the lower ends of the respective passages for the delivery of hopper contents subject to the operation of said feed screws, a control set mounted adjacent the lower ends of the feed screws and comprising intermittent driving and intermittent driven rotors, the latter being connected with respective feed screws whereby to selectively vary the time duration of respective screw rotation, a drive common to all of the driving rotors and having motion transmitting connection from the motor, pawls carried by the respective driving rotors, the driven rotors having peripherally spaced shoulders adapted for engagement by respective pawls with cam means adjacent each driven rotor and encircled by the pawl of the associated driving rotor, said cam being mounted in the path of movement of respective pawls and having portions of sufficient radial extent to displace the pawls from engagement with driven rotor shoulders for a distance of angular travel determined by the angular extent of the cam means, according to the positions of the respectively adjustable sectors thereof, and a control panel for said control set having dials connected with the respective cam sectors for predetermining angular positions of adjustment thereof and thereby determining the extent of conveyor screw movement in the course of a single rotation of the respective driving rotors.

12. The device of claim 11 in which said panel is further provided with a dial calibrated in terms of a number of cattle, the motion transmitting connections from said motor to said control set including means controlled by the last mentioned dial for determining the total amount of material fed from all of the hoppers to the hammer mill in the course of a given operation of the hammer mill motor.

13. Apparatus for preparing a batch of stock food comprising in combination a grinding and mixing device having a feeding opening, a plurality of feeding conveyors having feed screws and discharging into said opening, hoppers from which the respective conveyors operate for the delivery of contents of the respective hoppers into the opening of said device, intermittent driving means to the feed screws of the several conveyors including means for predetermining the relative rate of operation thereof by selectively varying the time duration of intermittent drive to said conveyor screws, and motor means operatively connected with said driving means and with said device and having a time control whereby said device and driving means may be set for a predetermined period of operation.

References Cited in the file of this patent

UNITED STATES PATENTS

| | | |
|---|---|---|
| 520,138 | Dralle | May 22, 1894 |
| 991,178 | Stock | May 2, 1911 |
| 1,583,892 | ver Mehr | May 11, 1926 |
| 1,825,475 | Pfeiffer | Sept. 29, 1931 |
| 2,279,287 | Chestnut et al. | Apr. 7, 1942 |
| 2,285,765 | Carswell | June 9, 1942 |
| 2,376,304 | Anderson | May 15, 1945 |
| 2,489,498 | Palmer | Nov. 29, 1949 |
| 2,658,644 | Lowe | Nov. 10, 1953 |
| 2,669,924 | Wiemer | Feb. 23, 1954 |

OTHER REFERENCES

Lockwood: Provender Milling, 3rd ed. (1949), Nothern Pub. Co., N.Y.C., pages 176–178 and 362–364.

"Ingenious Mechanisms for Designers and Inventors," vol. 3, edited by H. Horton, published by the Industrial Press, received May 9, 1951, pages 351–357.